(12) United States Patent
Lee (10) Patent No.: US 12,135,883 B2
(45) Date of Patent: Nov. 5, 2024

(54) METHOD AND SYSTEM FOR REUSE OF PARTIAL BAD BLOCK

(71) Applicant: SK hynix Inc., Icheon-si (KR)

(72) Inventor: Hee Youl Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/991,137

(22) Filed: Nov. 21, 2022

(65) Prior Publication Data

US 2024/0004557 A1    Jan. 4, 2024

(30) Foreign Application Priority Data

Jun. 29, 2022 (KR) .................. 10-2022-0079904

(51) Int. Cl.
*G06F 3/06* (2006.01)

(52) U.S. Cl.
CPC ............ *G06F 3/0619* (2013.01); *G06F 3/064* (2013.01); *G06F 3/0653* (2013.01); *G06F 3/0673* (2013.01)

(58) Field of Classification Search
CPC ............ G06F 11/1612; G06F 11/1666; G06F 11/2084; G06F 11/073; G06F 11/1008; G06F 11/1092; G06F 11/2053; G06F 11/30; G11C 29/88
See application file for complete search history.

(56) References Cited

U.S. PATENT DOCUMENTS

| 9,312,026 B2 | 4/2016 | Kochar et al. | |
| 9,653,172 B2* | 5/2017 | Lee .................. | G11C 16/28 |
| 10,275,156 B2* | 4/2019 | Ramalingam ....... | G06F 11/3037 |
| 2008/0177956 A1* | 7/2008 | Peddle .................. | G11C 29/88 |
| | | | 711/156 |
| 2010/0306582 A1* | 12/2010 | Han .................... | G06F 11/1068 |
| | | | 714/E11.085 |
| 2015/0277792 A1* | 10/2015 | Ma ....................... | G06F 3/0679 |
| | | | 711/103 |
| 2016/0055918 A1* | 2/2016 | Kochar .............. | G11C 16/0483 |
| | | | 365/185.11 |
| 2016/0217868 A1* | 7/2016 | Dutta ................. | G11C 16/0483 |
| 2018/0068740 A1* | 3/2018 | Lee ..................... | G11C 16/3445 |
| 2019/0130984 A1* | 5/2019 | Jean ....................... | G11C 16/32 |
| 2022/0066868 A1* | 3/2022 | Betz ...................... | G06F 11/076 |

FOREIGN PATENT DOCUMENTS

| KR | 1020170013404 A | 2/2017 |
| KR | 1020170046656 A | 5/2017 |

* cited by examiner

*Primary Examiner* — Khoa D Doan (74) *Attorney, Agent, or Firm* — WILLIAM PARK & ASSOCIATES LTD.

(57) ABSTRACT

Provided herein is a memory device, a memory system including the memory device, and a method of operating the memory system. The memory device including a memory cell array including a plurality of memory blocks, each of the plurality of memory blocks including a plurality of sub-blocks, peripheral circuits configured to perform a program operation on a memory block selected from among the plurality of memory blocks and configured to, when a program failure occurs during the program operation, move and store first data stored in a failed sub-block in which the program failure has occurred, among the plurality of sub-blocks, to a replacement block, among the plurality of memory blocks, and control logic configured to control the peripheral circuits to perform the program operation and generate bad block information from information about the failed sub-block.

14 Claims, 10 Drawing Sheets

METHOD AND SYSTEM FOR REUSE OF PARTIAL BAD BLOCK

CROSS-REFERENCE TO RELATED APPLICATION

The present application claims priority under 35 U.S.C. § 119(a) to Korean patent application number 10-2022-0079904, filed on Jun. 29, 2022, in the Korean Intellectual Property Office, the entire disclosure of which is incorporated herein by reference.

BACKGROUND

1. Technical Field

Various embodiments of the present disclosure generally relate to an electronic device, and more particularly to a memory device, a memory system including the memory device, and a method of operating the memory system.

2. Related Art

Recently, the paradigm for a computer environment has been converted into ubiquitous computing so that computer systems can be used anytime and anywhere. Due to this, the use of portable electronic devices such as mobile phones, digital cameras, and notebook computers has rapidly increased. In general, such portable electronic devices use a memory system which employs a memory device, in other words, use a data storage device. The data storage device is used as a main memory device or an auxiliary memory device for portable electronic devices.

A data storage device using a memory device is advantageous in that, since there is no mechanical driving part, stability and durability are excellent, an information access speed is very high, and power consumption is low. The data storage device, as examples of the memory system having such advantages, includes a universal serial bus (USB) memory device, memory cards having various interfaces, a solid state drive (SSD), etc.

Memory devices are roughly classified into a volatile memory device and a nonvolatile memory device.

Such a nonvolatile memory device has comparatively low write and read speed, but retains data stored therein even when the supply of power is interrupted. Therefore, the nonvolatile memory device is used to store data to be retained regardless of whether power is supplied. Examples of the nonvolatile memory device include a read-only memory (ROM), a mask ROM (MROM), a programmable ROM (PROM), an erasable programmable ROM (EPROM), an electrically erasable programmable ROM (EEPROM), a flash memory, a phase-change random access memory (PRAM), a magnetic RAM (MRAM), a resistive RAM (RRAM), a ferroelectric RAM (FRAM), etc. The flash memory is classified into a NOR type and a NAND type.

SUMMARY

An embodiment of the present disclosure may provide for a memory device. The memory device may include a memory cell array including a plurality of memory blocks, each of the plurality of memory blocks including a plurality of sub-blocks, peripheral circuits configured to perform a program operation on a memory block selected from among the plurality of memory blocks and configured to, when a program failure occurs during the program operation, move and store first data stored in a failed sub-block in which the program failure has occurred, among the plurality of sub-blocks, to a replacement block, among the plurality of memory blocks, and control logic configured to control the peripheral circuits to perform the program operation and generate bad block information from information about the failed sub-block.

An embodiment of the present disclosure may provide for a memory system. The memory system may include a memory device including a plurality of memory blocks, wherein each of the plurality of memory blocks include a plurality of sub-blocks, and wherein the memory device is configured to output information about a failed sub-block determined to be a bad block, among the plurality of sub-blocks, as bad block information, and a memory controller configured to receive and store the bad block information, and control the memory device such that, during an overall operation of the memory device, sub-blocks other than the failed sub-block, determined to be the bad block based on the bad block information, are selected and the overall operation is performed on the selected sub-blocks.

An embodiment of the present disclosure may provide for a method of operating a memory device. The method may include performing a program operation on a memory block selected from among a plurality of memory blocks, wherein each of the memory blocks, respectively, include a plurality of sub-blocks, when a program failure occurs during the program operation, moving and storing first data stored in a failed sub-block in which the program failure has occurred, among the plurality of sub-blocks in the selected memory block, to a replacement block, erasing the failed sub-block, and registering the failed sub-block as a bad block.

DETAILED DESCRIPTION

Specific structural or functional descriptions in the embodiments of the present disclosure introduced in this specification or application are provided as examples to describe embodiments according to the concept of the present disclosure. The embodiments according to the concept of the present disclosure may be practiced in various forms, and should not be construed as being limited to the embodiments described in the specification or application.

Hereinafter, the present disclosure will be described in detail based on embodiments of the present disclosure with reference to the attached drawings. Below, embodiments of the present disclosure will be described in detail with reference to the attached drawings.

Various embodiments of the present disclosure are directed to a memory device for efficiently managing a bad block, a memory system including the memory device, and a method of operating the memory system.

Figure 1:
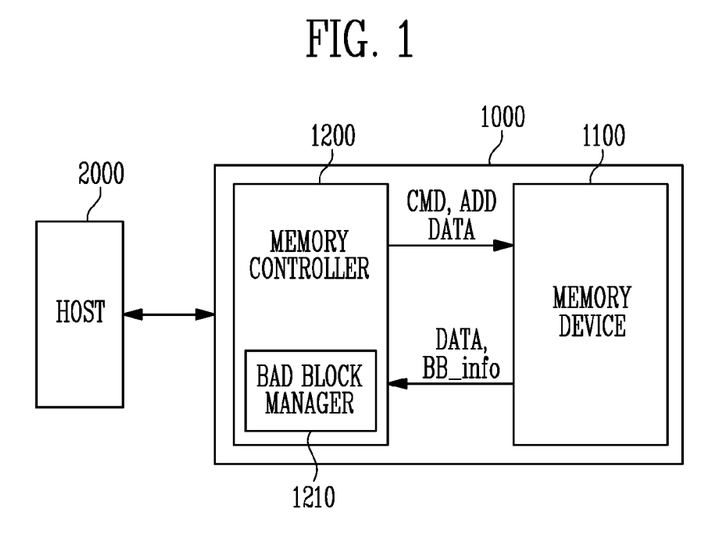
FIG. 1 is a block diagram illustrating a memory system including a memory device according to an embodiment of the present disclosure.

FIG. 1 is a diagram illustrating a memory system according to an embodiment of the present disclosure.

Referring to FIG. 1, a memory system 1000 may include a memory device 1100 which stores data, and a memory controller 1200 which controls the memory device 1100 under the control of a host 2000.

The host 2000 may communicate with the memory system 1000 using an interface protocol, such as Peripheral Component Interconnect-Express (PCI-E), Advanced Technology Attachment (ATA), Serial ATA (SATA), Parallel ATA (PATA) or Serial Attached SCSI (SAS). In addition, the interface protocol between the host 2000 and the memory system 1000 is not limited to the above-described examples, and may be one of various interface protocols, such as universal Serial Bus (USB), multi-media card (MMC), enhanced small disk interface (ESDI), and integrated drive electronics (IDE).

The memory controller 1200 may control the overall operation of the memory system 1000, and may control data exchange between the host 2000 and the memory device 1100. For example, the memory controller 1200 may program or read data by controlling the memory device 1100 in response to a request received from the host 2000. During a program operation, the memory controller 1200 may transmit a command CMD corresponding to the program operation, an address ADD, and data to be programmed DATA to the memory device 1100. Further, during a read operation, the memory controller 1200 may receive data DATA, read from the memory device 1100, may temporarily store the data DATA, and may transmit the temporarily stored data DATA to the host 2000.

The memory controller 1200 may include a bad block manager 1210. The bad block manager 1210 may receive bad block information BB_info from the memory device 1100, and may update and store information about a bad block, among a plurality of memory blocks included in the memory device 1100. The bad block manager 210 may control the memory device 1100 so that the bad block is not selected in the overall operation of the memory device 1100 based on the stored bad block information. For example, the bad block manager 1210 may control the memory device 1100 so that some of sub-blocks other than a sub-block determined to be a bad block, among a plurality of sub-blocks included in the memory device 1100, are selected in the overall operation of the memory device 1100 based on the stored bad block information. The bad block manager 1210 may manage a bad block on a sub-block basis. For example, the bad block manager 1210 may receive the bad block information BB_info from the memory device 1100, wherein the bad block information BB_info includes information about a sub-block determined to be a bad block, among a plurality of sub-blocks included in each of the plurality of memory blocks.

In an embodiment, the memory device 1100 may include a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus DRAM (RDRAM), or a flash memory.

The memory device 1100 may perform a program operation, a read operation or an erase operation under the control of the memory controller 1200.

The memory device 1100 according to the embodiment of the present disclosure may program memory cells included in a selected memory block to any one of an erased state and a plurality of program states, may read data programmed to the memory cells, or may erase data programmed to the memory cells. When a program operation, a read operation or an erase operation fails, the memory device 1100 may determine a sub-block in which a failure has occurred, among the plurality of sub-blocks included in the selected memory block, to be a bad block, and may then generate bad block information BB_info. In an embodiment, the memory device 1100 may perform a test program operation and a test read operation for detecting a bad block, may determine a sub-block for which program data and read data, obtained as results of the test program operation and the test read operation, are different from each other to be a bad block, and may then generate bad block information BB_info.

When at least one sub-block is determined to be a bad block, the memory device 1100 may move, stored in the sub-block determined to be the bad block, to a replacement block, may store the moved information in the replacement block, and may erase the sub-block determined to be the bad block. In an embodiment, when at least one sub-block is determined to be a bad block, the memory device 1100 may move information, stored in a memory block including the sub-block determined to be the bad block, to a replacement block, may store the moved information in the replacement block, and may erase the memory block including the sub-block determined to be the bad block.

Figure 2:
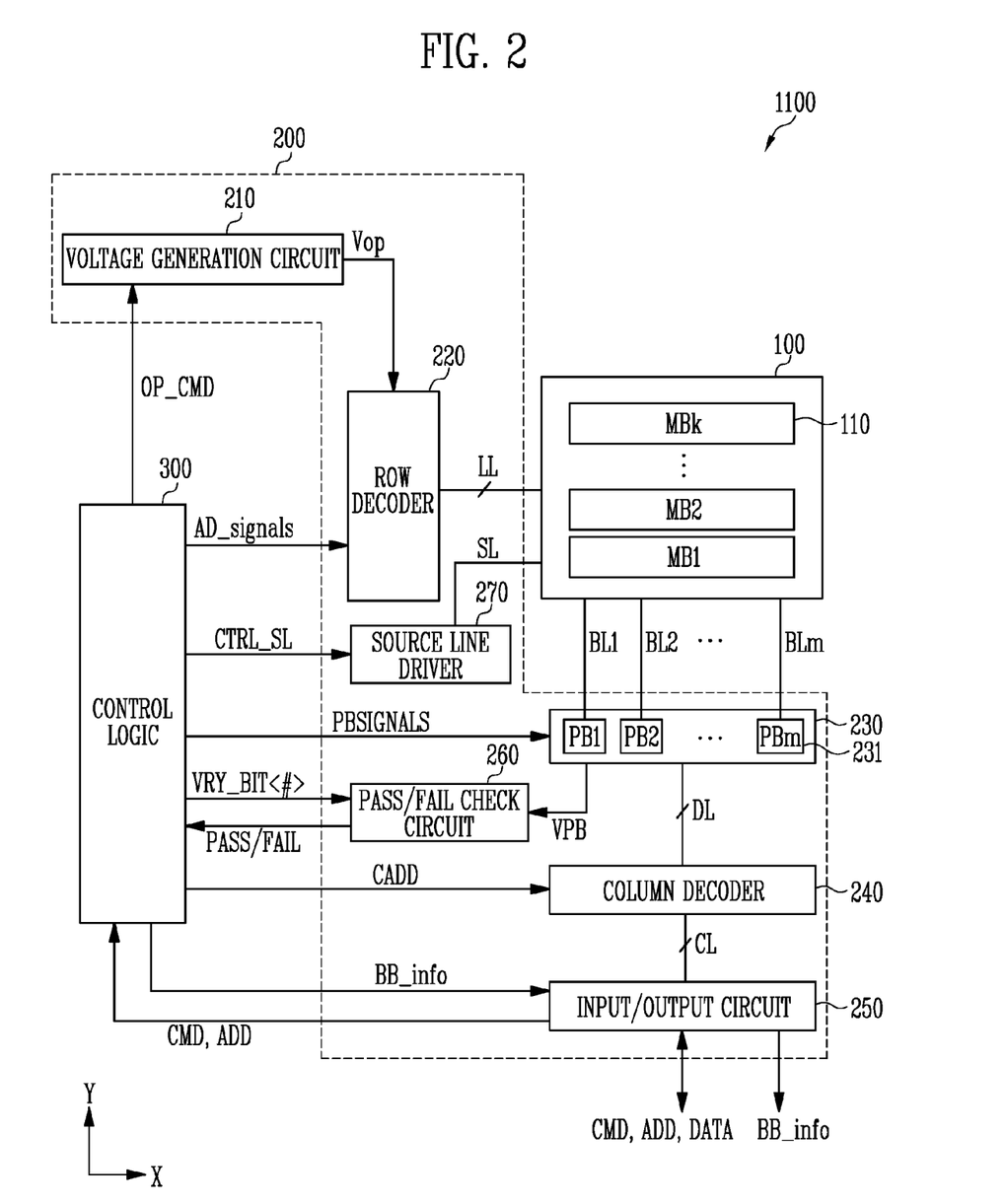
FIG. 2 is a diagram illustrating the memory device of FIG. 1.

FIG. 2 is a diagram illustrating the memory device of FIG. 1. Referring to FIG. 2, the memory device 1100 may include a memory cell array 100 in which data is stored. The memory device 1100 may include peripheral circuits 200 configured to perform a program operation for storing data in the memory cell array 100, a read operation for outputting the stored data, and an erase operation for erasing the stored data. The memory device 1100 may include control logic 300 which controls the peripheral circuits 200 under the control of a memory controller (e.g., 1200 of FIG. 1). The control logic 300 may be implemented as hardware, software, or a combination of hardware and software. For example, the control logic 300 may be a control logic circuit operating in accordance with an algorithm and/or a processor executing control logic code.

The memory cell array 100 may include a plurality of memory blocks MB1 to MBk 110 (where k is a positive integer). Local lines LL and bit lines BL1 to BLm (where m is a positive integer) may be coupled to each of the memory blocks MB1 to MBk 110. For example, the local lines LL may include a first select line, a second select line, and a plurality of word lines arranged between the first and second select lines. Also, the local lines LL may include dummy lines arranged between the first select line and the word lines and between the second select line and the word lines. Here, the first select line may be a source select line, and the second select line may be a drain select line. For example, the local lines LL may include the word lines, the drain and source select lines, and source lines SL. For example, the local lines LL may further include the dummy lines. For example, the local lines LL may further include pipelines. The local lines LL may be coupled to each of the memory blocks MB1 to MBk 110, and the bit lines BL1 to BLm may be coupled in common to the memory blocks MB1 to MBk 110. The memory blocks MB1 to MBk 110 may each be implemented in a two-dimensional (2D) or three-dimensional (3D) structure. For example, memory cells in the memory blocks 110 having a 2D structure may be arranged in a direction parallel to a substrate. For example, memory cells in the memory blocks 110 having a 3D structure may be vertically stacked on the substrate.

Each of the memory blocks MB1 to MBk 110 according to an embodiment of the present disclosure may include two or more sub-blocks. The detailed configuration of each memory block will be described later.

The peripheral circuits 200 may perform program, read, and erase operations on a selected memory block 110 under the control of the control logic 300. For example, the peripheral circuits 200 may include a voltage generation circuit 210, a row decoder 220, a page buffer group 230, a column decoder 240, an input/output circuit 250, a pass/fail check circuit 260, and a source line driver 270.

The voltage generation circuit 210 may generate various operating voltages Vop that are used for program, read, and erase operations in response to an operation signal OP_CMD. Further, the voltage generation circuit 210 may selectively discharge the local lines LL in response to the operation signal OP_CMD. For example, the voltage generation circuit 210 may generate a program voltage, a verify voltage, and a pass voltage under the control of the control logic 300.

The row decoder 220 may transfer the operating voltages Vop to the local lines LL coupled to the selected memory block 110 in response to row decoder control signals AD_signals. For example, during a program operation, the row decoder 220 may apply the program voltage, generated by the voltage generation circuit 210, to a selected word line, among the local lines LL, in response to the row decoder control signals AD_signals, and may apply the pass voltage, generated by the voltage generation circuit 210, to the remaining word lines, that is, unselected word lines.

The page buffer group 230 may include a plurality of page buffers PB1 to PBm 231 coupled to the bit lines BL1 to BLm. The page buffers PB1 to PBm 231 may be operated in response to page buffer control signals PBSIGNALS. For example, during a program operation, the page buffers PB1 to PBm 231 may temporarily store data to be programmed, and may adjust the potential levels of the bit lines BL1 to BLm based on the temporarily stored data to be programmed. Further, during a read or program verify operation, the page buffers PB1 to PBm 231 may sense the voltages or currents of the bit lines BL1 to BLm.

The column decoder 240 may transfer data between the input/output circuit 250 and the page buffer group 230 in response to a column address CADD. For example, the column decoder 240 may exchange data with the page buffers PB1 to PBm 231 through the data lines DL or may exchange data with the input/output circuit 250 through column lines CL.

The input/output circuit 250 may transmit a command CMD and an address ADD, received from the memory controller (e.g., 1200 of FIG. 1), to the control logic 300, or may exchange data DATA with the column decoder 240. The input/output circuit 250 may transmit bad block information BB_info, received from the control logic 300, to an external device (e.g., the memory controller 1200 of FIG. 1).

During a read operation or a program verify operation, the pass/fail check circuit 260 may generate a reference current in response to an enable bit VRY_BIT<#>, and may compare a sensing voltage VPB, received from the page buffer group 230, with a reference voltage, generated by the reference current, and then output a pass signal PASS or a fail signal FAIL. The sensing voltage VPB may be a voltage that is controlled based on the number of memory cells determined to have passed the program verify operation. The pass/fail check circuit 260 may generate and output a fail signal FAIL when the number of memory cells determined to be program-failed during a program verify operation in the program operation is greater than the preset number of memory cells. The source line driver 270 may be coupled to memory cells included in the memory cell array 100 through the source line SL, and may control a voltage to be applied to the source line SL. The source line driver 270 may receive a source line control signal CTRL_SL from the control logic 300, and may control a source line voltage to be applied to the source line SL in response to the source line control signal CTRL_SL.

The control logic 300 may control the peripheral circuits 200 by outputting the operation signal OP_CMD, the row decoder control signals AD_signals, the page buffer control signals PBSIGNALS, and the enable bit VRY_BIT<#> in response to the command CMD and the address ADD. Further, when a program failure has occurred during the program operation, the control logic 300 may determine a sub-block of a memory block in which the program failure has occurred to be a bad block, and may then generate bad block information BB_info. For example, when a fail signal FAIL is received from the pass/fail check circuit 260 after all of a plurality of program loops that are sequentially performed are completed during the program operation, the control logic 300 may determine that a program failure has occurred.

Further, the control logic 300 may read data stored in the sub-block determined to be the bad block, may store the read data in a replacement block, among the memory blocks MB1 to MBk 110, and may erase the sub-block determined to be the bad block. In an embodiment, the control logic 300 may read data stored in a memory block including the sub-block determined to be the bad block, may store the read data in a replacement block, among the memory blocks MB1 to MBk 110, and may erase the memory block including the sub-block.

Figure 3:
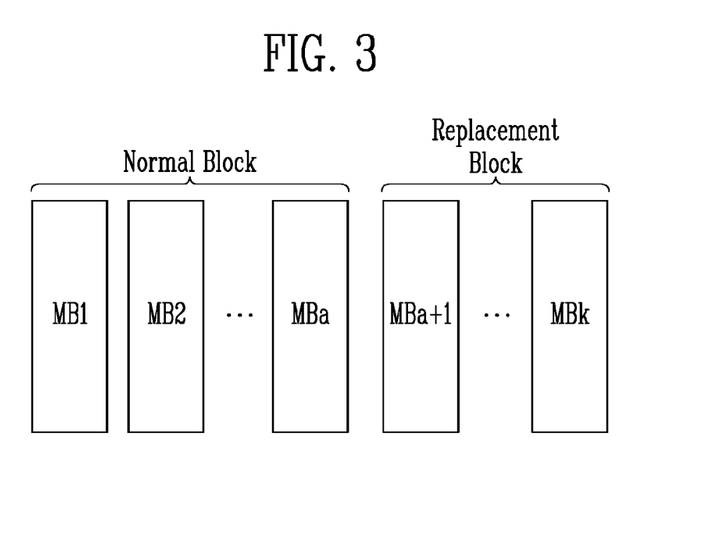
FIG. 3 is a diagram illustrating memory blocks included in a memory cell array of FIG. 2.

FIG. 3 is a diagram illustrating memory blocks included in the memory cell array of FIG. 2.

Referring to FIG. 3, a plurality of memory blocks MB1 to MBk included in the memory cell array may include normal blocks and at least one replacement block. The plurality of memory blocks MB1 to MBk may be configured to have a similar structure.

The normal blocks MB1 to MBa may be memory blocks, which are selected in the overall operation of the memory device 1100 of FIG. 2, e.g., a program operation, a read operation or an erase operation, and which store the data to be programmed, received from an external device (e.g., the memory controller 1200 of FIG. 1), read the stored data, or erase the stored data. Among the normal blocks MB1 to MBa, a selected memory block may be defined as a target block.

The replacement blocks MBa+1 to MBk may be memory blocks, which replace sub-blocks determined to be bad blocks, among the sub-blocks of each of the normal blocks MB1 to MBa.

For example, when a sub-block of the memory block MB1, among the normal blocks MB1 to MBa, is determined to be a bad block, address mapping is corrected such that an address corresponding to the sub-block determined to be the bad block is mapped to a sub-block of a memory block (e.g., MBa+1) included in the replacement blocks MBa+1 to MBk. During the overall operation, when an address corresponding to the sub-block determined to be the bad block is received from the memory controller 1200, the sub-block of the memory block MBa+1 included in the replacement blocks MBa+1 to MBk, instead of the sub-block of the memory block MB1 determined to be the bad block, is selected and the overall operation is performed on the sub-block of the memory block MBa+1.

Figure 4:
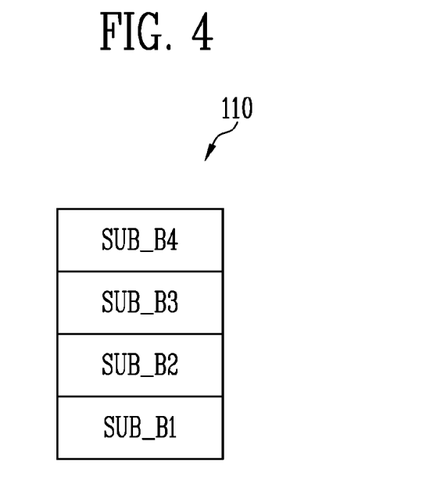
FIGS. 4 and 5 are diagrams illustrating a plurality of sub-blocks forming one memory block.
Figure 5:
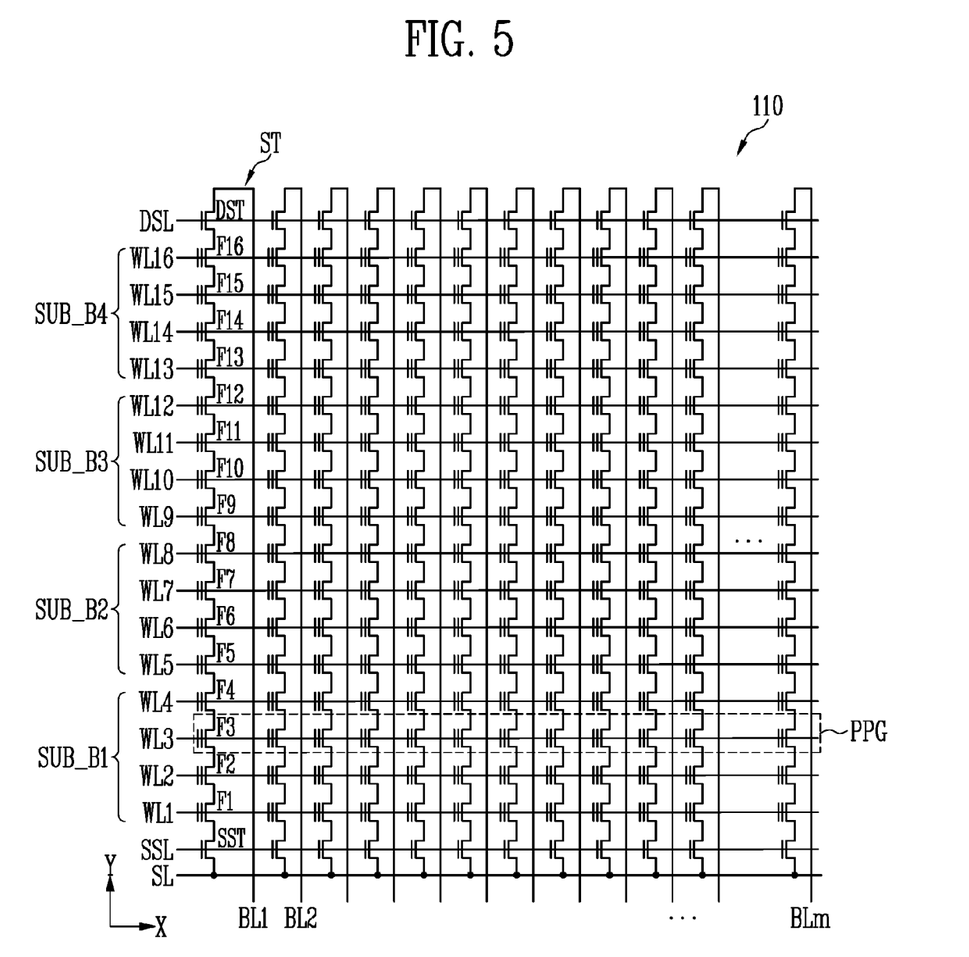

FIGS. 4 and 5 are diagrams illustrating a plurality of sub-blocks forming one memory block.

Referring to FIG. 4, the memory block 110 may include a plurality of sub-blocks SUB_B1 to SUB_B4.

Referring to FIG. 5, a plurality of word lines WL1 to WL16 arranged in parallel to each other between a first select line and a second select line may be coupled to the memory block 110. Here, the first select line may be a source select line SSL, and the second select line may be a drain select line DSL. For example, the memory block 110 may include a plurality of memory cell strings ST coupled between bit lines BL1 to BLm and a source line SL. The bit lines BL1 to BLm may be coupled to the memory cell strings ST, respectively, and the source line SL may be coupled in common to the memory cell strings ST. Because the memory cell strings ST may be configured in the same form, the memory cell string ST coupled to the first bit line BL1 will be described in detail by way of example.

The memory cell string ST may include a source select transistor SST, a plurality of memory cells F1 to F16, and a drain select transistor DST which are coupled in series to each other between the source line SL and the first bit line BL1. One memory cell string ST may include at least one source select transistor SST and at least one drain select transistor DST, and more memory cells than the memory cells MC1 to MC16 illustrated in the drawing may be included in the memory cell string ST.

A source of the source select transistor SST may be coupled to the source line SL, and a drain of the drain select transistor DST may be coupled to the first bit line BL1. The memory cells MC1 to MC16 may be coupled in series between the source select transistor SST and the drain select transistor DST. Gates of the source select transistors SST included in different memory cell strings ST may be coupled to the source select line SSL, gates of the drain select transistors DST included in different memory cell strings ST may be coupled to the drain select line DSL, and gates of the memory cells MC1 to MC16 may be coupled to a plurality of word lines WL1 to WL16, respectively. A group of memory cells coupled to the same word line, among the memory cells included in different memory cell strings ST, may be referred to as a 'physical page PPG'. Therefore, the memory block 110 may include a number of physical pages PPG identical to the number of word lines WL1 to WL16.

One memory cell may store one bit of data. This cell is typically designated as a "single-level cell (SLC)." In this case, one physical page PPG may store data corresponding to one logical page LPG. The data corresponding to one logical page LPG may include a number of data bits identical to the number of cells included in one physical page PPG. Further, one memory cell may store two or more bits of data. This cell is typically designated as a "multi-level cell (MLC)". Here, one physical page PPG may store data corresponding to two or more logical pages LPG.

A plurality of physical pages PPG included in the memory block 110 may be grouped into a plurality of sub-blocks SUB_B1 to SUB_B4.

For example, a plurality of physical pages PPG corresponding to first to fourth word lines WL1 to WL4 may be included in a sub-block SUB_B1, a plurality of physical pages PPG corresponding to fifth to eighth word lines WL5 to WL8 may be included in a sub-block SUB_B2, a plurality of physical pages PPG corresponding to ninth to twelfth word lines WL9 to WL12 may be included in a sub-block SUB_B3, and a plurality of physical pages PPG corresponding to thirteenth to sixteenth word lines WL13 to WL16 may be included in a sub-block SUB_B4.

In an embodiment, one memory block may include a plurality of physical pages PPG respectively corresponding to the plurality of word lines WL1 to WL16, and each of a plurality of sub-blocks SUB_B1 to SUB_B4 included in one memory block may include at least one of the plurality of physical pages PPG included in one memory block.

The plurality of memory cells F1 to F16 included in each of the plurality of memory cell strings ST included in one memory block may be grouped into a plurality of groups, which may correspond to the plurality of sub-blocks SUB_B1 to SUB_B4, respectively.

In an embodiment of the present disclosure, although one memory block is described as including four sub-blocks, one memory block may include at least two sub-blocks.

Figure 6:
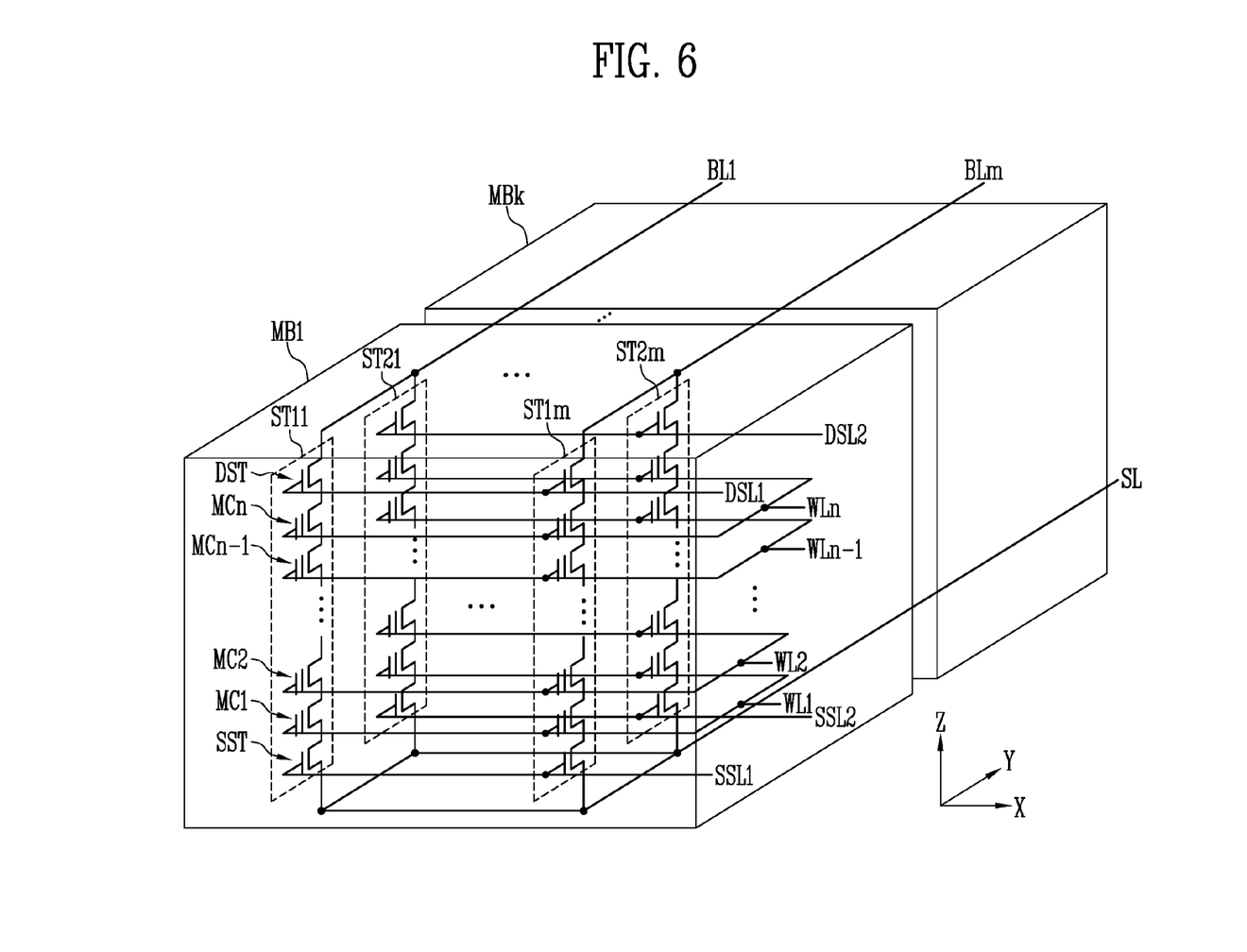
FIG. 6 is a diagram illustrating an example of a memory block having a 3D structure.

FIG. 6 is a diagram illustrating an example of a memory block having a 3D structure.

Referring to FIG. 6, the memory cell array 100 of FIG. 2 may include a plurality of memory blocks MB1 to MBk. Each of the memory blocks MB1 to MBk may include a plurality of memory cell strings ST11 to ST1$m$ and ST21 to ST2$m$. Each of the memory cell strings ST11 to ST1$m$ and ST21 to ST2$m$ may extend along a vertical direction (e.g., Z direction). In each of the memory blocks MB1 to MBk, m memory cell strings may be arranged in a row direction (e.g., X direction). Although, in FIG. 6, in each of the memory blocks MB1 to MBk, two memory cell strings are illustrated as being arranged in a column direction (e.g., Y direction), this arrangement is provided for convenience of description, and three or more memory cell strings may be arranged in the column direction (e.g., Y direction) in other embodiments.

Each of the memory cell strings ST11 to ST1$m$ and ST21 to ST2$m$ may include at least one source select transistor SST, first to n-th memory cells MC1 to MCn, and at least one drain select transistor DST.

The source select transistor SST of each memory cell string may be coupled between a source line SL and the memory cells MC1 to MCn. Source select transistors of memory cell strings arranged in the same row may be coupled to the same source select line. The source select transistors of the memory cell strings ST11 to ST1$m$ arranged in a first row may be coupled to a first source select line SSL1. The source select transistors of the memory cell strings ST21 to ST2$m$ arranged in a second row may be coupled to a second source select line SSL2. In other embodiments, the source select transistors of the memory cell strings ST11 to ST1$m$ and ST21 to ST2$m$ may be coupled in common to a single source select line.

The first to n-th memory cells MC1 to MCn in each memory cell string may be coupled in series between the source select transistor SST and the drain select transistor DST. Gates of the first to n-th memory cells MC1 to MCn may be coupled to first to n-th word lines WL1 to WLn, respectively.

In an embodiment, at least one of the first to n-th memory cells MC1 to MCn may be used as a dummy memory cell. In an embodiment, when the dummy memory cell is provided, the voltage or current of the corresponding memory cell string may be stably controlled. Accordingly, in an embodiment, the reliability of data stored in the memory blocks MB1 to MBk may be improved.

The drain select transistor DST of each memory cell string may be coupled between the corresponding bit line and the memory cells MC1 to MCn. The drain select transistors DST of memory cell strings arranged in the row direction may be coupled to a drain select line extending along the row direction. The drain select transistors DST of the memory cell strings ST11 to ST1$m$ in the first row may be coupled to a first drain select line DSL1. The drain select transistors DST of the memory cell strings ST21 to ST2$m$ in the second row may be coupled to a second drain select line DSL2.

The plurality of memory blocks MB1 to MBk are configured such that one memory block shares the word lines WL1 to WLn with another memory block, and the memory blocks sharing the word lines WL1 to WLn with each other may be defined as 'sharing memory blocks.'

Figure 7:
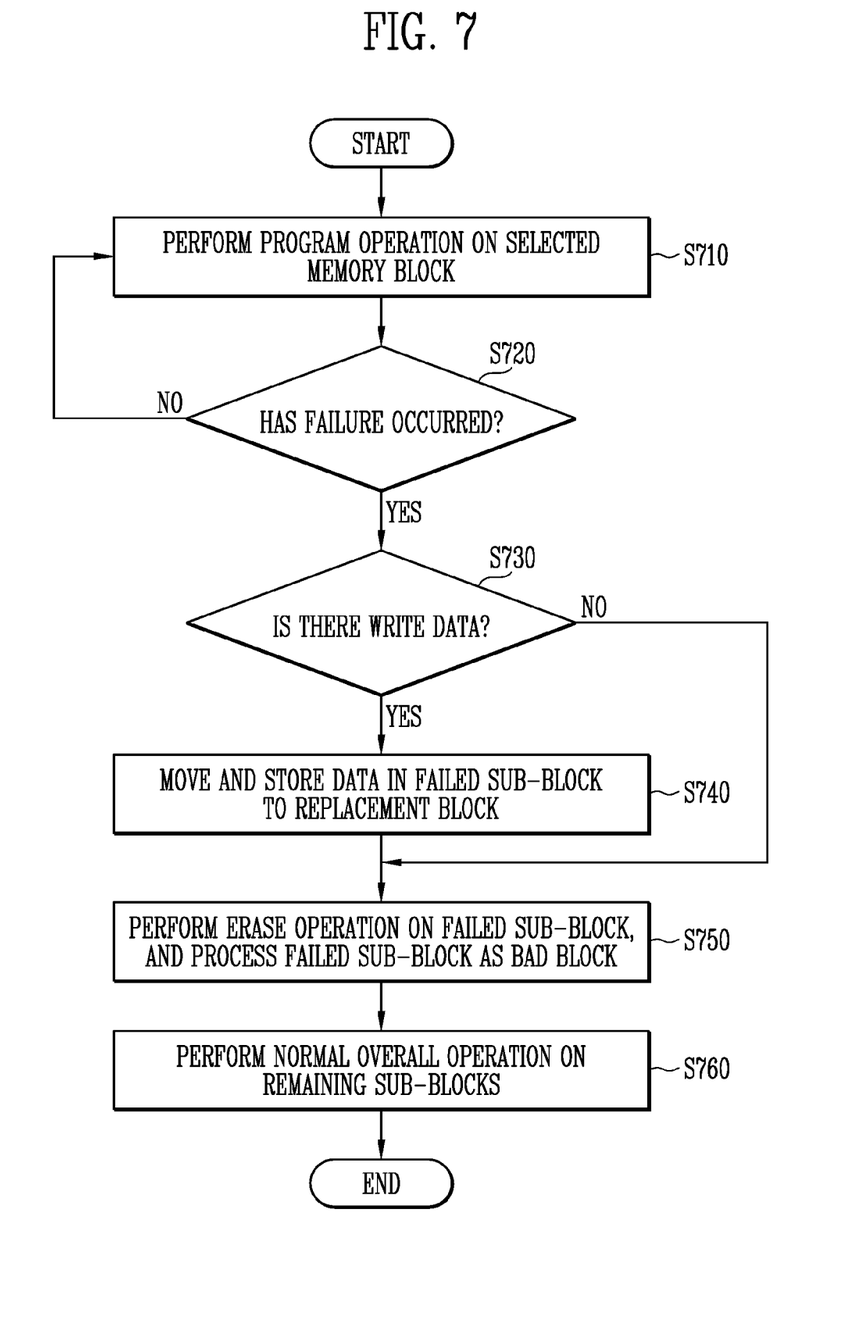
FIG. 7 is a flowchart illustrating a method of operating a memory system according to an embodiment of the present disclosure.

FIG. 7 is a flowchart illustrating a method of operating a memory system according to an embodiment of the present disclosure.

The method of operating the memory system according to the embodiment of the present disclosure will be described below with reference to FIGS. 1 to 7.

At step S710, the memory device 1100 may receive a command CMD corresponding to a program operation from an external device (e.g., memory controller 1200 of FIG. 1). The memory device 1100 may receive an address ADD and data to be programmed DATA, together with the command CMD.

The memory device 1100 may select a memory block (e.g., MB1), on which a program operation is to be performed, from among the plurality of memory blocks MB1 to MBk in response to the received program command CMD and address ADD, may sequentially program the selected memory block (e.g., MB1) on a page basis, and may perform the program operation for a program state selected from among a plurality of program states, using an incremental step pulse programming (ISPP) scheme, during the program operation on the selected page.

At step S720, during the program operation performed on the selected memory block (e.g., MB1) on a page basis, whether a failure has occurred may be determined. For example, when the program operation is performed on the selected page of the selected memory block (e.g., MB1), whether a failure has occurred is determined. When it is determined that a failure has not occurred as a result of the program operation on the selected page (in the case of "No"), a next page may be selected, and a program operation may be performed on the selected page at step S710.

When it is determined at step S720 that a failure has occurred as a result of the program operation on the selected page (in the case of "Yes"), a sub-block including the selected page may be determined to be a sub-block in which a failure has occurred (i.e., a failed sub-block), and whether there is write data stored in the failed sub-block may be determined at step S730. For example, when a failure occurs as a result of performing the program operation on the selected page (e.g., a page corresponding to a word line WL6) of the selected memory block (e.g., MB1), whether there is write data stored in the sub-block SUB_B2 including the selected page is determined.

When it is determined at step S730 that there is the write data stored in the sub-block SUB_B2 including the selected page (in case of "Yes"), the write data stored in the failed sub-block SUB_B2 may be moved to and stored in a replacement block at step S740. For example, the page buffer group 230 may read the write data stored in the failed sub-block SUB_B2, and may program the read data to the replacement block (e.g., MBa+1).

When it is determined at step S730 that there is no write data stored in the sub-block SUB_B2 including the selected page (in case of "No"), or when the above-described step S740 is performed, an erase operation may be performed on the failed sub-block, and the failed sub-block may be processed as a bad block at step S750. For example, the peripheral circuits 200 may perform an erase operation of erasing pieces of data stored in the failed sub-block under the control of the control logic 300. For example, the source line driver 270 may receive a source line control signal CTRL_SL from the control logic 300, and may apply an erase voltage to the source line SL of the selected memory block MB1 based on the source line control signal CTRL_SL. The page buffer group 230 may control the bit lines BL1 to BLm to float, or may apply the erase voltage. Among the word lines WL1 to WL16 of the selected memory block MB1, the word lines WL5 to WL8 corresponding to the failed sub-block SUB_B2 may be controlled to a ground voltage level, and the remaining word lines WL1 to WL4 and WL9 to WL16 may be controlled to a positive voltage level. Due thereto, pieces of data stored in the memory cells included in the failed sub-block SUB_B2 are erased. That is, the peripheral circuits 200 may selectively erase only the failed sub-block SUB_B4, among the plurality of sub-blocks SUB_B1 to SUB_B4 included in the selected memory block MB1.

The control logic 300 may generate and output bad block information BB_info including information indicating that the failed sub-block SUB_B2 is determined to be a bad block, and the bad block information BB_info, output from the control logic 300, may be transmitted to the bad block manager 1210 of the memory controller 1200. The bad block manager 1210 may receive the bad block information BB_info from the memory device 1100, and may update the sub-block SUB_B2 of the selected memory block MB1 to a bad block and register the bad block. That is, the bad block manager 1210 may update and register the bad block on a sub-block basis.

At step S760, the control logic 300 may perform the normal overall operation on the remaining sub-blocks SUB_B1, SUB_B3, and SUB_B4 of the selected memory block MB1.

Figure 8:
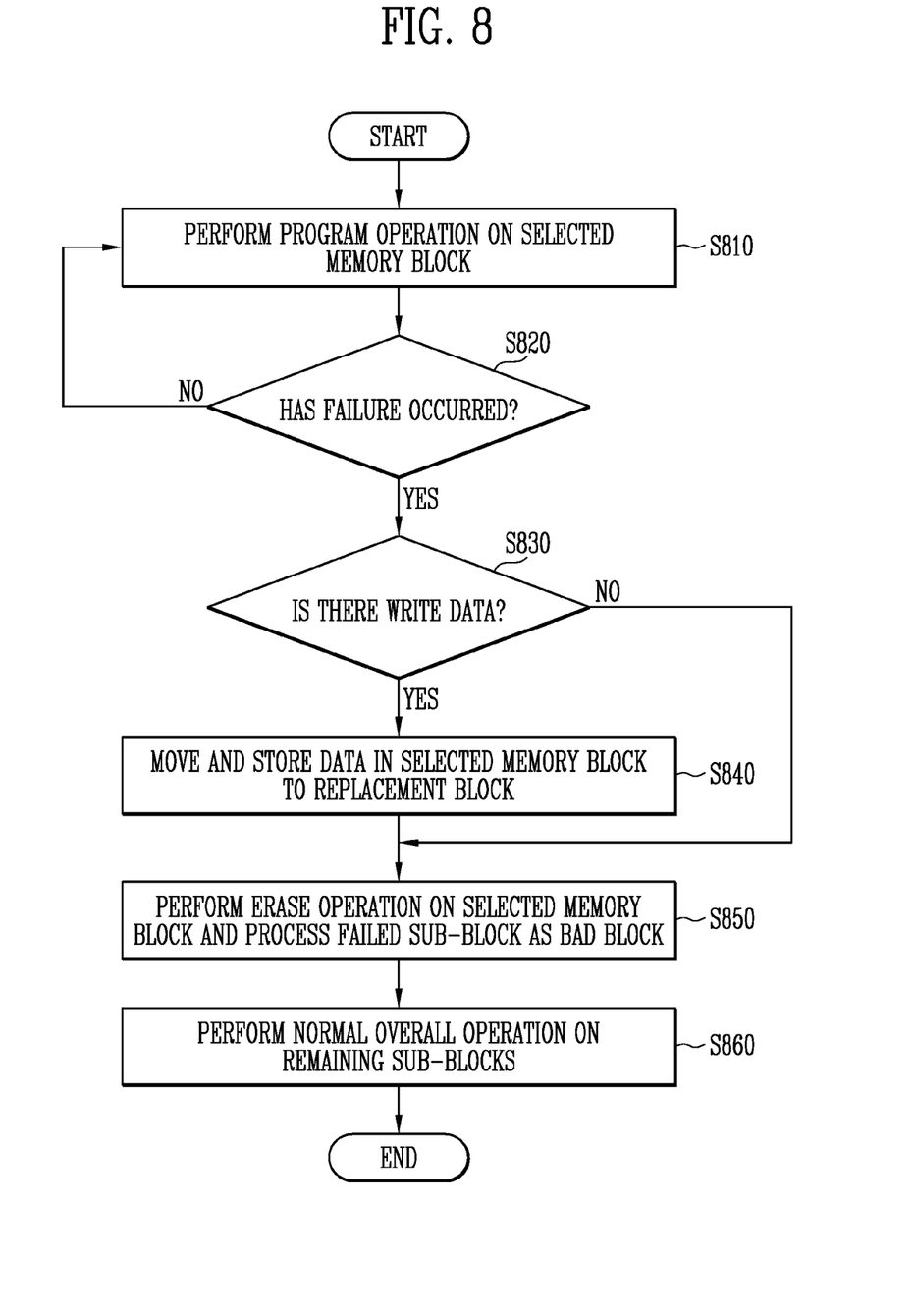
FIG. 8 is a flowchart illustrating a method of operating a memory system according to an embodiment of the present disclosure.

FIG. 8 is a flowchart illustrating a method of operating a memory system according to an embodiment of the present disclosure.

The method of operating the memory system according to the embodiment of the present disclosure will be described in detail with reference to FIGS. 1 to 6 and 8.

At step S810, the memory device 1100 may receive a command CMD corresponding to a program operation from an external device (e.g., memory controller 1200 of FIG. 1). The memory device 1100 may receive an address ADD and data to be programmed DATA, together with the command CMD.

The memory device 1100 may select a memory block (e.g., MB1), on which a program operation is to be performed, from among the plurality of memory blocks MB1 to MBk in response to the received program command CMD and address ADD, may sequentially program the selected memory block (e.g., MB1) on a page basis, and may perform the program operation for a program state selected from among a plurality of program states, using an incremental step pulse programming (ISPP) scheme, during the program operation on the selected page.

At step S820, during the program operation performed on the selected memory block (e.g., MB1) on a page basis, whether a failure has occurred is determined. For example, when the program operation is performed on the selected page of the selected memory block (e.g., MB1), whether a failure has occurred is determined. When it is determined that a failure has not occurred as a result of the program operation on the selected page (in the case of "No"), a next page may be selected, and a program operation may be performed on the selected page at step S810.

When it is determined at step S820 that a failure has occurred as a result of the program operation on the selected page (in the case of "Yes"), a sub-block including the selected page may be determined to be a failed sub-block, and whether there is write data stored in the selected memory block MB1 including the failed sub-block may be determined at step S830. For example, when a failure occurs as a result of performing the program operation on the selected page (e.g., a page corresponding to a word line WL6) of the selected memory block (e.g., MB1), whether there is write data stored in the selected memory block (e.g., MB1) is determined.

When it is determined at step S830 that there is write data stored in the selected memory block (e.g., MB1) (in case of "Yes"), the write data stored in the selected memory block MB1 may be moved to and stored in a replacement block at step S840. For example, the page buffer group 230 may read the write data stored in the selected memory block MB1, and may program the read data to the replacement block (e.g., MBa+1).

When there is no write data stored in the selected memory block (e.g., MB1) (in the case of "No") at step S830, or when the above-described step S840 is performed, an erase operation may be performed on the selected memory block (e.g., MB1) and the failed sub-block may be processed as a bad block at step S850. For example, the peripheral circuits 200 may perform an erase operation of erasing pieces of data stored in the selected memory block (e.g., MB1) under the control of the control logic 300. For example, the source line driver 270 may receive a source line control signal CTRL_SL from the control logic 300, and may apply an erase voltage to the source line SL of the selected memory block MB1 based on the source line control signal CTRL_SL. The page buffer group 230 may control the bit lines BL1 to BLm to float, or may apply the erase voltage. The word lines WL1 to WL16 of the selected memory block MB1 may be controlled to a ground voltage level. Due thereto, pieces of data stored in the memory cells included in the selected memory block (e.g., MB1) are erased.

The control logic 300 may generate and output bad block information BB_info including information indicating that the failed sub-block SUB_B2 is determined to be a bad block, and the bad block information BB_info, output from the control logic 300, may be transmitted to the bad block manager 1210 of the memory controller 1200. The bad block manager 1210 may receive the bad block information BB_info from the memory device 1100, and may update the sub-block SUB_B2 of the selected memory block MB1 to a bad block and register the bad block. That is, the bad block manager 1210 may update and register the bad block on a sub-block basis.

At step S860, the control logic 300 may perform a normal overall operation on the remaining sub-blocks SUB_B1, SUB_B3, and SUB_B4 of the selected memory block MB1.

Figure 9:
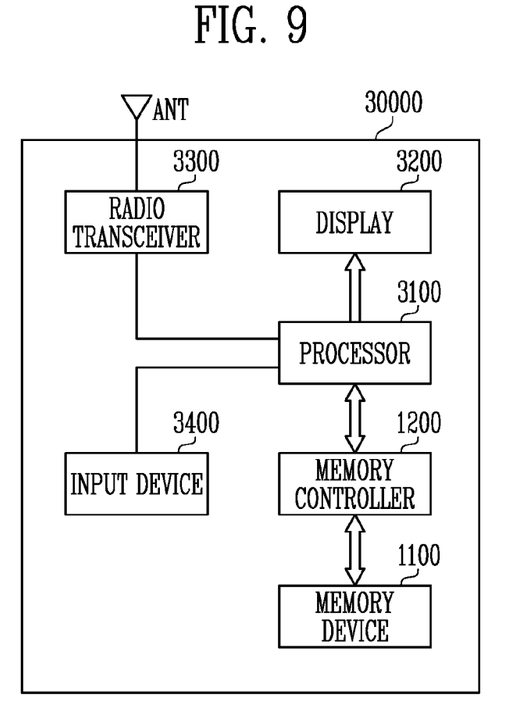
FIG. 9 is a diagram illustrating an embodiment of a memory system.

FIG. 9 is a diagram illustrating an embodiment of a memory system.

Referring to FIG. 9, a memory system 30000 may be implemented as a cellular phone, a smart phone, a tablet PC, a personal digital assistant (PDA) or a wireless communication device. The memory system 30000 may include a memory device 1100 and a memory controller 1200 that is capable of controlling the operation of the memory device 1100. The memory controller 1200 may control a data access operation of the memory device 1100, for example, a program operation, an erase operation or a read operation, under the control of a processor 3100.

Data programmed to the memory device 1100 may be output via a display 3200 under the control of the memory controller 1200.

A radio transceiver 3300 may exchange radio signals through an antenna ANT. For example, the radio transceiver 3300 may convert radio signals received through the antenna ANT into signals that may be processed by the processor 3100. Therefore, the processor 3100 may process the signals output from the radio transceiver 3300, and may transmit the processed signals to the memory controller 1200 or the display 3200. The memory controller 1200 may program the signals processed by the processor 3100 to the memory device 1100. Further, the radio transceiver 3300 may convert signals output from the processor 3100 into radio signals, and may output the radio signals to an external device through the antenna ANT. An input device 3400 may be used to input a control signal for controlling the operation of the processor 3100 or data to be processed by the processor 3100. The input device 3400 may be implemented as a pointing device such as a touch pad or a computer mouse, a keypad or a keyboard. The processor 3100 may control the operation of the display 3200 so that data output from the memory controller 1200, data output from the radio transceiver 3300, or data output from the input device 3400 is output via the display 3200.

In an embodiment, the memory controller 1200 capable of controlling the operation of the memory device 1100 may be implemented as a part of the processor 3100 or as a chip provided separately from the processor 3100. Furthermore, the memory controller 1200 may be implemented through the example of the memory controller 1200 illustrated in FIG. 1, and the memory device 1100 may be implemented through the example of the memory device 1100 illustrated in FIG. 2.

Figure 10:
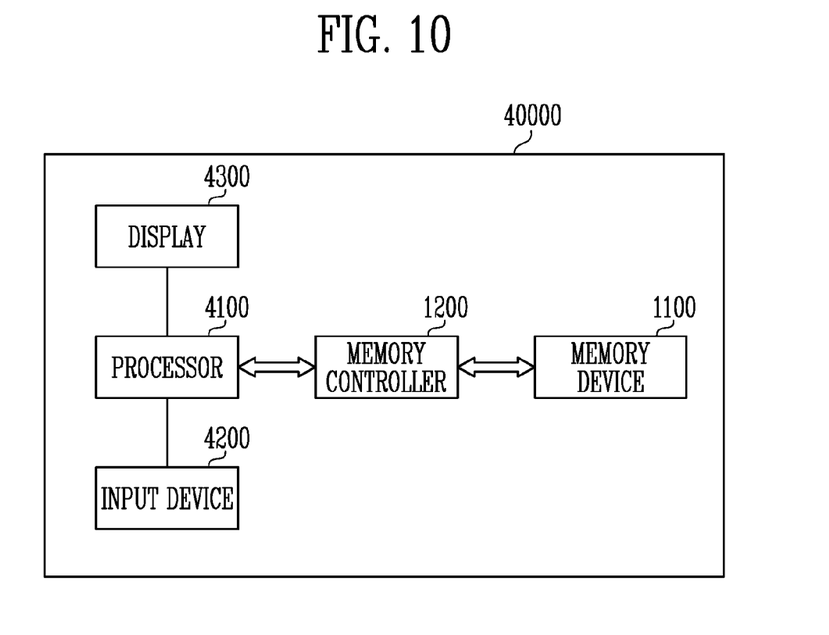
FIG. 10 is a diagram illustrating an embodiment of a memory system.

FIG. 10 is a diagram illustrating an embodiment of a memory system.

Referring to FIG. 10, a memory system 40000 may be embodied in a personal computer, a tablet PC, a net-book, an e-reader, a personal digital assistant (PDA), a portable multimedia player (PMP), an MP3 player, or an MP4 player.

The memory system 40000 may include a memory device 1100 and a memory controller 1200 that is capable of controlling a data processing operation of the memory device 1100.

A processor 4100 may output data, stored in the memory device 1100, via a display 4300 according to data input through an input device 4200. For example, the input device 4200 may be implemented as a pointing device such as a touch pad or a computer mouse, a keypad or a keyboard.

The processor 4100 may control the overall operation of the memory system 40000, and may control the operation of the memory controller 1200. In an embodiment, the memory controller 1200 capable of controlling the operation of the memory device 1100 may be implemented as a part of the processor 4100 or as a chip provided separately from the processor 4100. Furthermore, the memory controller 1200 may be implemented through the example of the memory controller 1200 illustrated in FIG. 1, and the memory device 1100 may be implemented through the example of the memory device 1100 illustrated in FIG. 2.

Figure 11:
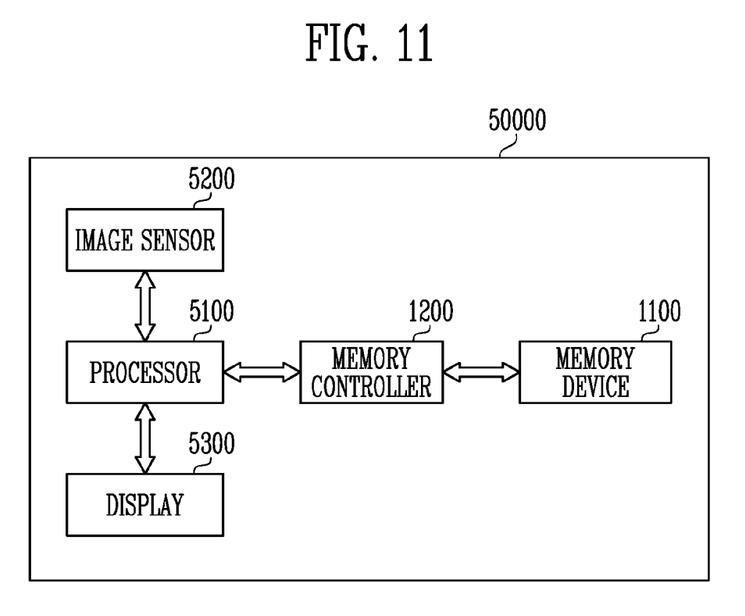
FIG. 11 is a diagram illustrating an embodiment of a memory system.

FIG. 11 is a diagram illustrating an embodiment of a memory system.

Referring to FIG. 11, a memory system 50000 may be implemented in an image processing device, for example, a digital camera, a mobile phone provided with a digital camera, a smartphone provided with a digital camera, or a tablet PC provided with a digital camera.

The memory system 50000 may include a memory device 1100 and a memory controller 1200 that is capable of controlling a data processing operation of the memory device 1100, for example, a program operation, an erase operation or a read operation.

An image sensor 5200 of the memory system 50000 may convert an optical image into digital signals, and the converted digital signals may be transmitted to a processor 5100 or the memory controller 1200. Under the control of the processor 5100, the converted digital signals may be output via a display 5300 or may be stored in the memory device 1100 through the memory controller 1200. Further, data stored in the memory device 1100 may be output via the display 5300 under the control of the processor 5100 or the memory controller 1200.

In an embodiment, the memory controller 1200 capable of controlling the operation of the memory device 1100 may be implemented as a part of the processor 5100 or as a chip provided separately from the processor 5100. Furthermore, the memory controller 1200 may be implemented through the example of the memory controller 1200 illustrated in FIG. 1, and the memory device 1100 may be implemented through the example of the memory device 1100 illustrated in FIG. 2.

Figure 12:
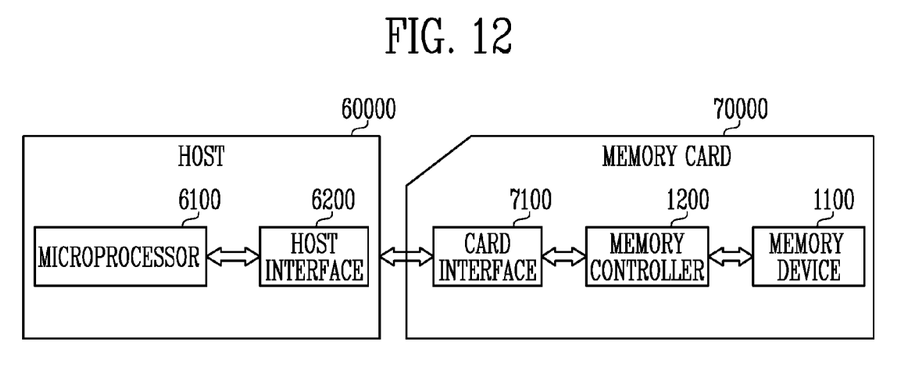
FIG. 12 is a diagram illustrating an embodiment of a memory system.

FIG. 12 is a diagram illustrating an embodiment of a memory system.

Referring to FIG. 12, a memory system 70000 may be implemented as a memory card or a smart card. The memory system 70000 may include a memory device 1100, a memory controller 1200, and a card interface 7100.

The memory controller 1200 may control data exchange between the memory device 1100 and the card interface 7100. In an embodiment, the card interface 7100 may be, but is not limited to, a secure digital (SD) card interface or a multi-media card (MMC) interface. Furthermore, the memory controller 1200 may be implemented through the example of the memory controller 1200 illustrated in FIG. 1, and the memory device 1100 may be implemented through the example of the memory device 1100 illustrated in FIG. 2.

The card interface 7100 may interface data exchange between a host 60000 and the memory controller 1200 according to a protocol of the host 60000. In an embodiment, the card interface 7100 may support a universal serial bus (USB) protocol and an interchip (IC)-USB protocol. Here, the card interface 7100 may refer to hardware capable of supporting a protocol which is used by the host 60000, software installed in the hardware, or a signal transmission method performed by the hardware.

When the memory system 70000 is coupled to a host interface 6200 of the host 60000 such as a PC, a tablet PC, a digital camera, a digital audio player, a mobile phone, console video game hardware, or a digital set-top box, the host interface 6200 may perform data communication with the memory device 1100 through the card interface 7100 and the memory controller 1200 under the control of a microprocessor 6100.

In accordance with the present disclosure, in various embodiments, memory blocks may be more efficiently managed by managing a bad block on a sub-block basis.

What is claimed is:

1. A memory device, comprising:
   a memory cell array including a plurality of memory blocks, each of the plurality of memory blocks including a plurality of sub-blocks;
   peripheral circuits configured to perform a program operation on a memory block selected from among the plurality of memory blocks and configured to, when a program failure occurs during the program operation, move and store first data stored in a failed sub-block in which the program failure has occurred, among the plurality of sub-blocks, to a replacement block, among the plurality of memory blocks; and
   control logic configured to control the peripheral circuits to perform the program operation and generate bad block information from information about the failed sub-block,
   wherein each of the plurality of memory blocks comprises a plurality of physical pages corresponding to a plurality of word lines, each of the plurality of sub-blocks comprises one or more of the plurality of physical pages, and the one or more of the plurality of physical pages comprised in each of the plurality of sub-blocks are different from each other, and
   wherein the peripheral circuits move and store the first data, stored in the failed sub-block, to the replacement block, and thereafter erase the failed sub-block.

2. The memory device according to claim 1, wherein each of the plurality of memory blocks comprises a plurality of memory cell strings, and a plurality of memory cells included in each of the plurality of memory cell strings are grouped into a plurality of groups respectively corresponding to the plurality of sub-blocks.

3. The memory device according to claim 1, wherein the plurality of memory blocks comprise a plurality of normal memory blocks and the replacement block.

4. The memory device according to claim 1, wherein the peripheral circuits move and store second data, stored in remaining sub-blocks except for the failed sub-block among the plurality of sub-blocks included in the selected memory block, to the replacement block during an operation of moving and storing the first data stored in the failed sub-block to the replacement block.

5. The memory device according to claim 4, wherein:
   the peripheral circuits move and store the first data and the second data to the replacement block and thereafter erase all of the plurality of sub-blocks included in the selected memory block.

6. A memory system, comprising:
   a memory device comprising a plurality of memory blocks, wherein each of the plurality of memory blocks include a plurality of sub-blocks, and wherein the memory device is configured to output information about a failed sub-block determined to be a bad block, among the plurality of sub-blocks, as bad block information; and a memory controller configured to receive and store the bad block information, and control the memory device such that, during an overall operation of the memory device, sub-blocks other than the failed sub-block, determined to be the bad block based on the bad block information, are selected and the overall operation is performed on the selected sub-blocks, wherein each of the plurality of memory blocks comprises a plurality of physical pages corresponding to a plurality of word lines, each of the plurality of sub-blocks comprises one are of the plurality of physical pages, and the one are of the plurality of physical pages comprised in each of the plurality of sub-blocks are different from each other, wherein the memory device further comprises:

a memory cell array including the plurality of memory blocks;

peripheral circuits configured to perform a program operation on a memory block selected from among the plurality of memory blocks, and configured to, when a program failure occurs during the program operation, determine the failed sub-block in which the program failure has occurred, among the plurality of sub-blocks, to be the bad block and to move and store first data stored in the failed sub-block to a replacement block, among the plurality of memory blocks; and control logic configured to control the peripheral circuits to perform the program operation and generate the bad block information from information about the failed sub-block, and wherein the peripheral circuits move and store the first data, stored in the failed sub-block, to the replacement block and thereafter erase the failed sub-block.

7. The memory system according to claim 6, wherein each of the plurality of memory blocks comprises a plurality of memory cell strings, and a plurality of memory cells included in each of the plurality of memory cell strings are grouped into a plurality of groups respectively corresponding to the plurality of sub-blocks.

8. The memory system according to claim 6, wherein the plurality of memory blocks comprise a plurality of normal memory blocks and the replacement block.

9. The memory system according to claim 6, wherein the peripheral circuits move and store second data, stored in remaining sub-blocks except for the failed sub-block among the plurality of sub-blocks included in the selected memory block, to the replacement block during an operation of moving and storing the first data stored in the failed sub-block to the replacement block.

10. The memory system according to claim 9, wherein the peripheral circuits move and store the first data and the second data to the replacement block and thereafter erase all of the plurality of sub-blocks included in the selected memory block.

11. A method of operating a memory device, comprising:

performing a program operation on a memory block selected from among a plurality of memory blocks, wherein each of the plurality of memory blocks, respectively, include a plurality of sub-blocks;

when a program failure occurs during the program operation, moving and storing first data stored in a failed sub-block in which the program failure has occurred, among the plurality of sub-blocks in the selected memory block, to a replacement block;

erasing the failed sub-block; and registering the failed sub-block as a bad block, wherein each of the plurality of memory blocks comprises a plurality of physical pages corresponding to a plurality of word lines, each of the plurality of sub-blocks comprises one or more of the plurality of physical pages, and the one or more of the plurality of physical pages comprised in each of the plurality of sub-blocks are different from each other.

12. The method according to claim 11, wherein each of the plurality of memory blocks comprises a plurality of memory cell strings, and a plurality of memory cells included in each of the plurality of memory cell strings are grouped into a plurality of groups respectively corresponding to the plurality of sub-blocks.

13. The method according to claim 11, wherein moving and storing the first data stored in the failed sub-block to the replacement block comprises:

moving and storing second data stored in remaining sub-blocks except for the failed sub-block among the plurality of sub-blocks included in the selected memory block to the replacement block.

14. The method according to claim 13, wherein erasing the failed sub-block comprises:

erasing all of the plurality of sub-blocks included in the selected memory block.

* * * * *